(12) United States Patent
Cortinovis et al.

(10) Patent No.: US 10,718,341 B2
(45) Date of Patent: Jul. 21, 2020

(54) ACTIVE DAMPING OF OSCILLATIONS IN A CONTROL PROCESS

(71) Applicant: ABB Schweiz AG, Baden (CH)

(72) Inventors: Andrea Cortinovis, Dietikon (CH); Bjornar Bohagen, Sætre (NO); Mehmet Mercangöz, Stein (CH)

(73) Assignee: ABB Schweiz AG, Baden (CH)

( * ) Notice: Subject to any disclaimer, the term of this patent is extended or adjusted under 35 U.S.C. 154(b) by 237 days.

(21) Appl. No.: 15/162,229

(22) Filed: May 23, 2016

(65) Prior Publication Data

US 2016/0356277 A1     Dec. 8, 2016

(30) Foreign Application Priority Data

Jun. 3, 2015   (EP) .................................... 15170408

(51) Int. Cl.
| | |
|---|---|
| *F04D 27/00* | (2006.01) |
| *F04D 25/06* | (2006.01) |
| *F04D 29/66* | (2006.01) |
| *F04D 27/02* | (2006.01) |
| *F04D 17/10* | (2006.01) |

(52) U.S. Cl.
CPC ............. *F04D 25/06* (2013.01); *F04D 17/10* (2013.01); *F04D 27/001* (2013.01); *F04D 27/0261* (2013.01); *F04D 29/661* (2013.01); *F04D 29/665* (2013.01); *F04D 29/668* (2013.01); *F05D 2270/10* (2013.01); *F05D 2270/333* (2013.01); *F05D 2270/334* (2013.01)

(58) Field of Classification Search
CPC .. F04D 29/668; F04D 27/004; F04D 27/0261; F04D 15/0055; F04D 15/0066
See application file for complete search history.

(56) References Cited

U.S. PATENT DOCUMENTS

| | | | | | |
|---|---|---|---|---|---|
| 4,177,649 | A | * | 12/1979 | Venema | ................ F25B 49/022 417/43 |
| 4,425,800 | A | * | 1/1984 | Claassen | ................ G01L 9/0001 73/114.51 |
| 4,716,347 | A | * | 12/1987 | Fujimoto | .......... H02M 7/53873 318/432 |

(Continued)

FOREIGN PATENT DOCUMENTS

| | | |
|---|---|---|
| EP | 0523252 A1 | 1/1993 |
| EP | 0695606 A1 | 2/1996 |

(Continued)

OTHER PUBLICATIONS

Centrifugal Compressor Case Study, by Eckert, published 2010.*

(Continued)

*Primary Examiner* — Charles G Freay
*Assistant Examiner* — Thomas Fink
(74) *Attorney, Agent, or Firm* — Whitmyer IP Group LLC (57) ABSTRACT

A method for actively damping oscillations in a compression process, the method being performed by a controller. The method includes acquiring process data from a compression process, performing oscillation frequency estimation of any detected oscillations in the process data, generating a damping signal based on the oscillation frequency estimation, and providing the damping signal to an electrical drive of the compression process.

13 Claims, 4 Drawing Sheets

(56) References Cited

U.S. PATENT DOCUMENTS

| | | | | |
|---|---|---|---|---|
| 5,547,344 | A * | 8/1996 | Sugiyama | F04C 23/008 137/625.43 |
| 5,575,262 | A * | 11/1996 | Rohde | F02M 55/04 123/456 |
| 5,879,307 | A * | 3/1999 | Chio | A61B 5/02116 600/485 |
| 6,796,183 | B2 | 9/2004 | Noell | |
| 7,109,679 | B2 | 9/2006 | Edson et al. | |
| 7,423,411 | B2 * | 9/2008 | Sihler | H02P 23/04 322/19 |
| 2001/0025489 | A1 * | 10/2001 | Bockling | B60T 11/10 60/533 |
| 2003/0021701 | A1 * | 1/2003 | Kolodziej | F04D 25/163 417/243 |
| 2006/0232250 | A1 * | 10/2006 | Sihler | H02P 9/10 322/58 |
| 2006/0244425 | A1 * | 11/2006 | Sihler | H02P 9/105 322/58 |
| 2009/0093911 | A1 * | 4/2009 | Caillat | F04B 39/0027 700/280 |
| 2010/0124509 | A1 * | 5/2010 | Brun | F04B 39/0027 417/1 |
| 2010/0141193 | A1 * | 6/2010 | Rotondo | F01D 15/08 318/432 |
| 2010/0319334 | A1 * | 12/2010 | Kley | B60T 8/4068 60/325 |
| 2011/0289911 | A1 * | 12/2011 | Vonderwell | F15B 7/006 60/431 |
| 2012/0100011 | A1 * | 4/2012 | Sommer | F04D 27/02 417/44.1 |
| 2013/0162186 | A1 * | 6/2013 | Schramm | H02P 21/05 318/400.23 |
| 2014/0048962 | A1 | 2/2014 | Rollins et al. | |
| 2014/0212266 | A1 * | 7/2014 | Lee | F04B 11/00 415/1 |
| 2015/0282721 | A1 * | 10/2015 | Chen | A61B 5/02108 600/495 |
| 2016/0161322 | A1 * | 6/2016 | Jadhav | G01L 19/02 702/45 |
| 2019/0368500 | A1 * | 12/2019 | Epstein | F04D 25/04 |

FOREIGN PATENT DOCUMENTS

| | | |
|---|---|---|
| EP | 2390748 A2 | 11/2011 |
| GB | 2318887 A | 5/1998 |

OTHER PUBLICATIONS

Pumps / compressors P&ID symbols, by www.enggcyclopedia.com (https://www.enggcyclopedia.com/2011/02/pumps-compressors-pid-symbols/), published 2011.*

Vibrations in Reciprocating Machinery and Piping Systems, by Wachel, published 1994.*

Torque Oscillations of Synchronous Motors Under Starting Conditions, by Lopez, published 1987.*

Pulsations in Centrifugal Compressor Installations, by Kurz, published 2006 (Year: 2006).*

European Search Report Application No. 15170408.7 Completed: Nov. 16, 2015; dated Nov. 23, 2015 6 Pages.

"Modelling Valve Stiction" by M. A. A. Shoukat Choudhury, N. F. Thornhill and S. L. Shah, Control Engineering Practice 13 (2005) 641-658., 2005.

Chowdhary, Girish, et al. "A Frequency Domain for Real-Time Detection of Oscillations", Georgia Institute of Technology, Journal of Aerospace Computing, Information and Communication, vol. 8, Issue 2, Published Feb. 1, 2011, 17 pages.

* cited by examiner

ACTIVE DAMPING OF OSCILLATIONS IN A CONTROL PROCESS

TECHNICAL FIELD

Embodiments presented herein relate to oscillations in a control process, and particularly to a method for actively damping oscillations in a control process.

BACKGROUND

Figure 1:
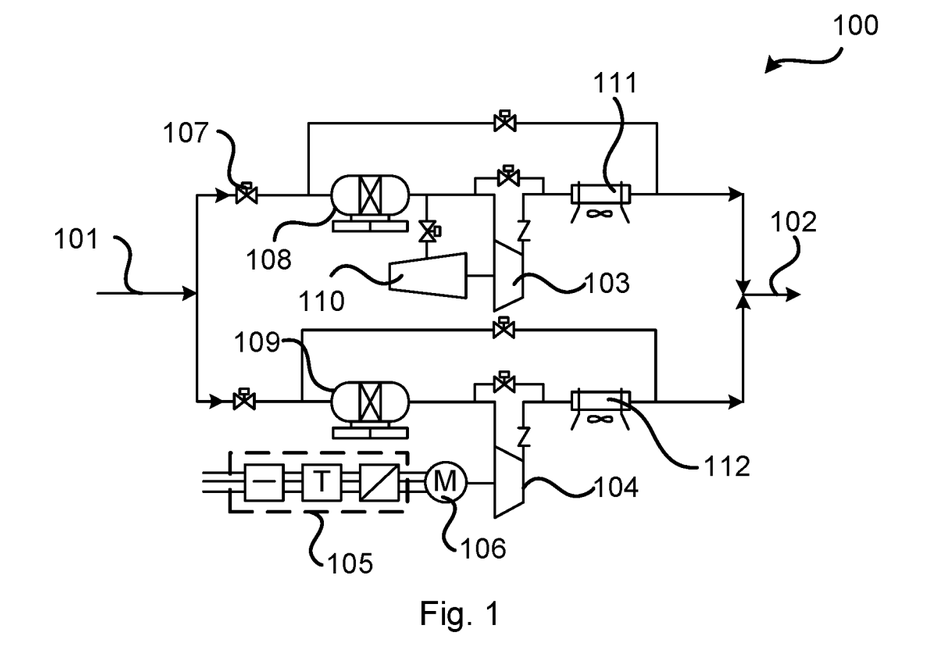
FIG. 1 is a schematic diagram illustrating a known compression system.

Compressors, such as centrifugal compressors, are widely used in extraction applications, processing plants and pipeline applications to compress and distribute gas streams. A common arrangement of a known compression system 100 for such applications is shown in FIG. 1, where typical components are visible.

The compression system 100 comprises a station inlet header 101 for receiving a medium and a station outlet header 102 for providing the medium after having been processed by the compression system 100. Between the station inlet header 101 and the station outlet header 102 there are provided two centrifugal compressors 103,104. The centrifugal compressor 104 is controlled by a variable frequency drive 105 and motor 106. From the station inlet header 101 the medium passes process and safety valves, one of which is referenced at 107, and scrubbers 108,109 before being fed to the centrifugal compressors 103,104. The medium compressed by the centrifugal gas compressor 103 is partially used as fuel gas in the gas turbine 110 to drive the gas compressor 110. On its way from the centrifugal compressors 103,104 the medium passes gas coolers 111 and 112.

Due to external as well as internal disturbances and interactions between different control layers, the components of the control system can suffer from oscillations during normal operation. This is generally undesired as the stability of the process is disturbed and the piping system and other components of the control system are put under stress.

The responsibility of control of centrifugal compressors is commonly shared by an anti-surge controller and a process controller. The anti-surge controller is responsible to keep the compression system in the stable operating region on the right side of the surge line, whereas the process controller regulates either the discharge flow, the suction pressure, the discharge pressure or the pressure ratio to the set point requirements coming from higher automation levels or human operators by manipulating the speed or torque of the driving system. Other control systems might be present depending on specific applications, e.g. a suction pressure controller manipulating an upstream valve. In the current industry practice these controllers are all using distributed proportional-integral-derivative (PID) loops which are typically not communicating with each other.

During normal operation it is often the case that small oscillations are present in the compression system. These oscillations can be caused by a number of effects. Some of these effects will be summarized next.

A mismatch between set point and real value written to the actuator (especially important for valves, which have usually inaccurate actuation/positioning systems) may cause oscillations.

Stick-Slip behavior of recycle valves and other process valves may cause oscillations. This is disclosed in "Modelling Valve Stiction" by M. A. A. Shoukat Choudhury, N. F. Thornhill and S. L. Shah, Control Engineering Practice 13 (2005) 641-658, 2005.

Persistent or pulsating disturbances upstream and downstream of the considered application may cause oscillations.

Wet gas conditions may cause oscillations.

Not considered interactions between different control loops (e.g. two process controllers of two different machines oscillate against each other) may cause oscillations.

Badly tuned controllers in the compression system (e.g. the process controller) or outdated tuning (e.g. process conditions changed significantly) may cause oscillations.

Such oscillations are not desired due to the fact that they lower the lifetime of components and perturb the stability of the control system and the quality of the control performance.

Dead-time compensation and/or detuning of the control loops help to deal with oscillations at the cost of reduced control performance. Such mechanisms are passive measures that can help or improve process damping.

However, there is still a need for an improved damping of oscillations in a control process.

SUMMARY

An object of embodiments herein is to provide efficient damping of oscillations in a control process.

According to a first aspect there is presented a method for actively damping oscillations in a compression process. The method is performed by a controller. The method comprises acquiring process data from a compression process. The method comprises performing oscillation frequency estimation of any defected oscillations in the process data. The method comprises generating a damping signal based on the oscillation frequency estimation. The method comprises providing the damping signal to an electrical drive of the compression process.

Advantageously this provides efficient damping of oscillations in a control process.

Advantageously this provides improved control performance, process safety and stability requirements for compression applications.

Advantageously this provides improved energy efficiency and zero emissions compared to gas-turbine driven compressors.

According to a second aspect there is presented a controller for actively damping oscillations in a compression process. The controller comprises processing circuitry. The processing circuitry is configured to cause the controller to perform a set of operations as defined in the method according to the first aspect.

According to a third aspect there is presented a computer program for actively damping oscillations in a compression process, the computer program comprising computer program code which, when run on a controller, causes the controller to perform a method according to the first aspect.

According to a fourth aspect there is presented a computer program product comprising a computer program according to the third aspect and a computer readable means on which the computer program is stored.

According to a fifth aspect there is presented a control system comprising a controller according to the second aspect and an electrical drive configured to receive the damping signal from the controller and thereby be controlled by the controller.

It is to be noted that any feature of the first, second, third, fourth and fifth aspects may be applied to any other aspect, wherever appropriate. Likewise, any advantage of the first aspect may equally apply to the second, third, fourth, and/or fifth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided byway of example so that this disclosure will be thorough and complete, and will fully convey the scope of the inventive concept to those skilled in the art. Like numbers refer to like elements throughout the description. Any step or feature illustrated by dashed lines should be regarded as optional.

The embodiments disclosed herein involves to manipulate the electrical (variable-speed) drive in order to actively damp oscillations caused by the effects listed above. Such manipulation minimizes the performance fluctuations and improves the stability of the control system.

In order to obtain such active damping of oscillations there is provided a controller, a method performed by the controller, a computer program comprising code, for example in the form of a computer program product, that when run on a controller, causes the controller to perform the method. There is also provided a control system comprising such a controller and an electrical drive.

Figure 2:
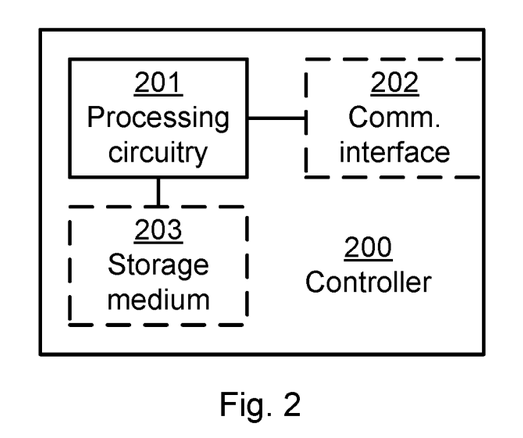
FIG. 2 is a schematic diagram showing functional units of a controller according to an embodiment.

FIG. 2 schematically illustrates, in terms of a number of functional units, the components of a controller 200 according to an embodiment. Processing circuitry 201 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 401 (as in FIG. 4), e.g. in the form of a storage medium 203.

Particularly, the processing circuitry 201 is configured to cause the controller 200 to perform a set of operations, or steps, S102-S112. These operations, or steps, S102-S112 will be disclosed below. For example, the storage medium 203 may store the set of operations, and the processing circuitry 201 may be configured to retrieve the set of operations from the storage medium 203 to cause the controller 200 to perform the set of operations. The set of operations may be provided as a set of executable instructions.

Thus the processing circuitry 201 is thereby arranged to execute methods as herein disclosed. The storage medium 203 may also comprise persistent storage, which, for example, can be any single one or combination of magnetic memory, optical memory, solid state memory or even remotely mounted memory. The controller 200 may further comprise a communications interface 202 for communications with entities and devices, for example to acquire process data and to provide a damping signal and a control signal.

The processing circuitry 201 controls the general operation of the controller 200 e.g. by sending data and control signals to the communications interface 202 and the storage medium 203, by receiving data and reports from the communications interface 202, and by retrieving data and instructions from the storage medium 203. Other components, as well as the related functionality, of the controller 200 are omitted in order not to obscure the concepts presented herein.

Figure 3:
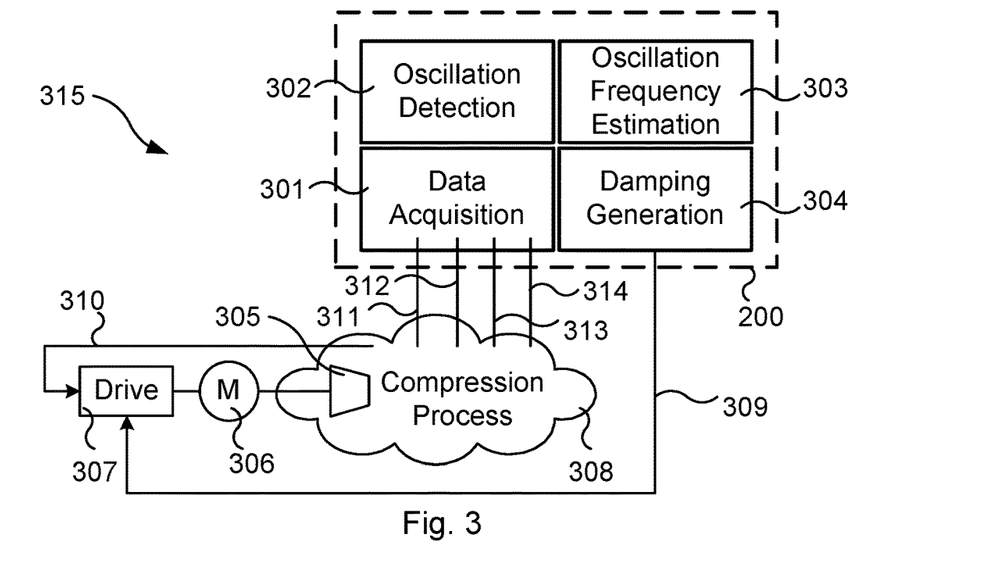
FIG. 3 is a schematic diagram showing functional modules of a controller in a control system according to an embodiment.

FIG. 3 schematically illustrates, in terms of a number of functional modules, the components of a controller 200 being part of a control system 315 according to an embodiment. The controller 200 has five interfaces, as indicated by signals 309, 311, 312, 313, 314, through which it directly or indirectly interacts with other entities and devices, such as an electrical drive 307, a motor 306, and a gas compressor 305 as part of a compression process 308, of the control system 315. Signal 310 is a reference signal providing feedback from the compression process 308 to the electrical drive 307.

The controller 200 of FIG. 3 comprises a number of functional modules; a data acquisition module 301 configured to perform below step S102, an oscillation detection module 302 configured to perform below step S104 (partly), an oscillation frequency estimation module 303 configured to perform below step S104 (partly), and a damping generation module 304 configured to perform below step S106 and, optionally, any of below steps S108a and S110. The functionality of each functional module 301-304 will be further disclosed below in the context of which the functional modules 301-304 may be used. In general terms, each functional module 301-304 may be implemented in hardware or in software. Preferably, one or more or all functional modules 301-304 may be implemented by the processing circuitry 201, possibly in cooperation with functional units 202 and/or 203. The processing circuitry 201 may thus be arranged to from the storage medium 203 fetch instructions as provided by a functional module 301-304 and to execute these instructions, thereby performing any steps as will be disclosed hereinafter.

In general terms, the data acquisition module 301 is configured to acquire relevant process data either through standard measurement equipment and/or through electrical signals from the electrical drive 307 and/or through mechanical signals by means of signals 311,312,313,314.

In general terms, the oscillation detection module 302 is configured to execute an oscillation detection algorithm to process the process data in windows and thereby to detect if a significant oscillation is present in one or more of the signals. This can be performed using standard methods like the one described by G. Chowdhary, S. Srinivasan and E. Johnson, in "A Frequency Domain Method for Real-Time Dectection of Oscillations", JACIC, 2010, which is based on the Discrete Fourier Transform (DFT).

In general terms, the oscillation frequency estimation module 303 is configured to, when triggered by the oscillation detection module 302 as a result of an oscillation being detected, determine the oscillation frequency to be damped. One possibility is to analyze the frequency spectrum in some historical windows and to estimate which frequency content contributes the most to the observed oscillation. The estimation of the oscillation frequency can also be based on time-domain or frequency domain signals, using for example Kalman filtering (KF), extended Kalman filtering (EKF) or moving horizon estimation (MHE).

In general terms, the damping generation module 304 is configured to generate the damping signal which is provided to the electrical drive 307 and added to its reference signal 310. No model or other prior knowledge is needed to actively damp the oscillations. Further, it does not matter what the root cause for the oscillations is. The electrical drive 307 may then generate a signal to manipulate the motor 306 and to fulfill the required set point change.

The controller 200 may be configured to enable an end-user to provide input regarding one or more frequency ranges which will not be damped. This may require the introduction of an additional functional module which is configured to cause the active damping to be performed if the frequency $f_o$ is outside the specified one or more frequency ranges. Special care has to be taken however to differentiate and stay as further away as possible from oscillation frequencies that correspond to surge or rotating stall in any of the compressors present in the control system.

Assuming that a model of the process is given (e.g. through step responses between electrical drive 307 and compressor flow or electrical drive 307 and surge distance), the damping system can be realized using advanced techniques.

Figure 4:
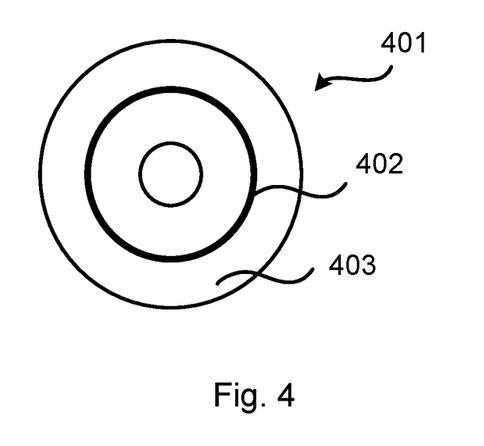
FIG. 4 shows one example of a computer program product comprising computer readable means according to an embodiment.

FIG. 4 shows one example of a computer program product 401 comprising computer readable means 403. On this computer readable means 403, a computer program 402 can be stored, which computer program 402 can cause the processing circuitry 201 and thereto operatively coupled entities and devices, such as the communications interface 202 and the storage medium 203, to execute methods according to embodiments described herein. The computer program 402 and/or computer program product 401 may thus provide means for performing any steps as herein disclosed.

In the example of FIG. 4, the computer program product 401 is illustrated as an optical disc, such as a CD (compact disc) or a DVD (digital versatile disc) or a Blu-Ray disc. The computer program product 401 could also be embodied as a memory, such as a random access memory (RAM), a read-only memory (ROM), an erasable programmable read-only memory (EPROM), or an electrically erasable programmable read-only memory (EEPRQM) and more particularly as a non-volatile storage medium of a device in an external memory such as a USB (Universal Serial Bus) memory or a Flash memory, such as a compact Flash memory. Thus, while the computer program 402 is here schematically shown as a track on the depicted optical disk, the computer program 402 can be stored in any way which is suitable for the computer program product 401.

Figure 6:
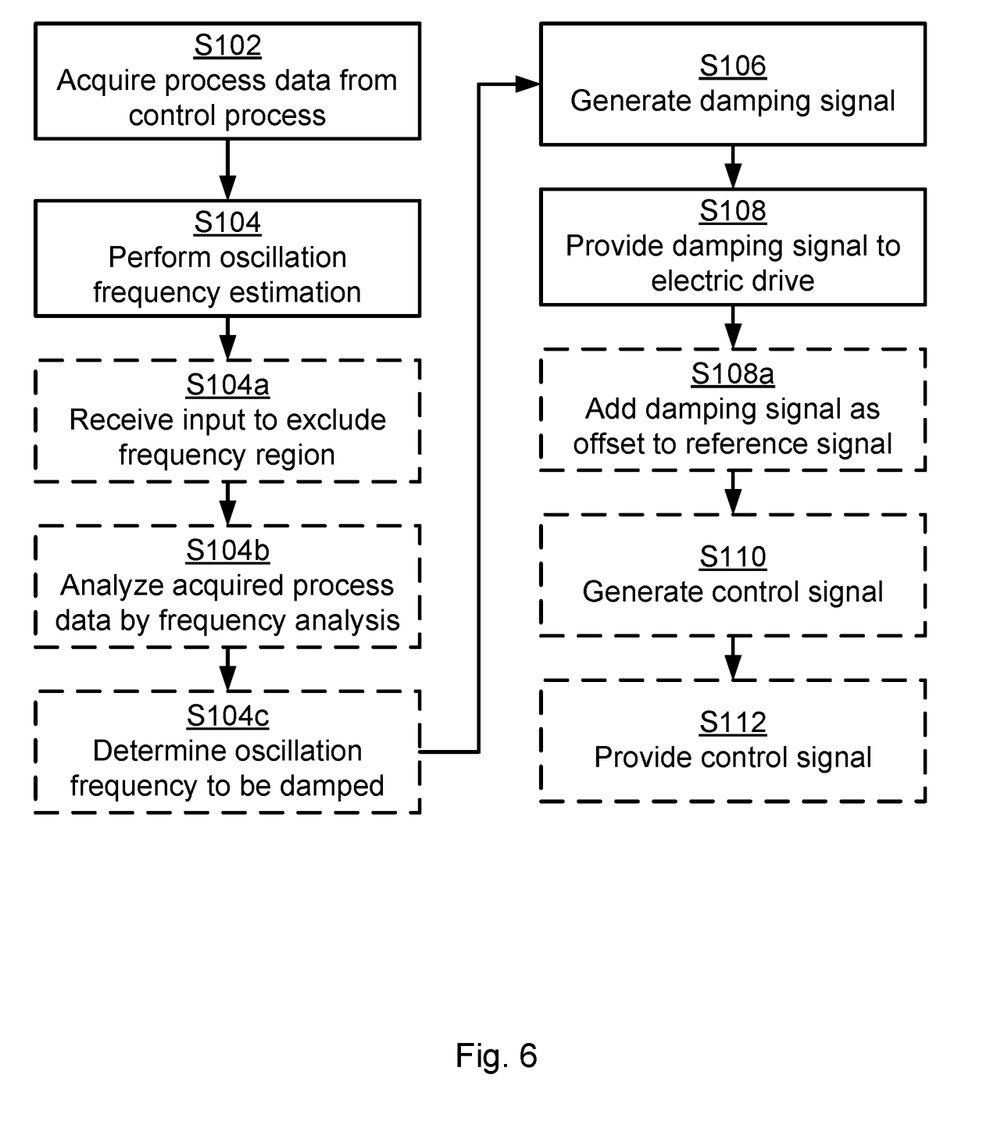
FIG. 6 is a flowchart of methods according to embodiments.

FIG. 6 is a flow chart illustrating embodiments of methods for actively damping oscillations in a control process. The methods are performed by the controller 200. The methods are advantageously provided as computer programs 402.

The present inventive concept overcomes the above mentioned problems by noting that active mechanisms could be used to damp oscillations in compression systems using electrical variable-speed drivers. In order to do so the herein disclosed controller 200 acquires process data. Particularly, the controller 200 is configured to, in a step S102, acquire process data from a compression process 308. This acquiring may be implemented by the above disclosed data acquisition module 301.

The controller 200 then checks the process data for oscillations. Particularly, the controller 200 is configured to, in a step S104, perform oscillation frequency estimation of any detected oscillations in the process data. This oscillation frequency estimation may be implemented by the above disclosed oscillation frequency estimation module 303, possibly jointly with the above disclosed oscillation detection module 302.

It is assumed that an oscillation indeed is detected in the process data. A damping signal is therefore generated in order to actively dampen the detected oscillation. Particularly, the controller 200 is configured to, in a step S106, generate a damping signal 309 based on the oscillation frequency estimation. This generation of the damping signal 309 may be implemented by the above disclosed damping generation module 304, possibly jointly with the above disclosed oscillation frequency estimation module 303.

In order for the damping signal 309 to have an impact on the compression process 308 the damping signal 309 is provided to an electrical drive 307. Particularly, the controller 200 is configured to, in a step S108, provide the damping signal 309 to the electrical drive 307 of the compression process 308. This provision of the damping signal 309 may be implemented by the above disclosed damping generation module 304.

Embodiments relating to further details of mechanisms for actively damping oscillations in a control process will now be disclosed.

According to an embodiment the compression process is a compression process of a centrifugal gas compressor 305. Hence, according to this embodiment the damping signal 309 is provided to the electrical drive 307 of the centrifugal gas compressor 305.

The damping signal is a signal that dampens the estimated oscillations. Hence, according to this embodiment the damping signal 309 is generated (as in step S106) and/or provided (as in step S108) to dampen the detected oscillation(s) in the process data.

There may be different frequencies for which oscillations may be detected. As an example, the oscillation frequency estimation may be configured to estimate oscillations in a frequency range from 0.1 Hz to 10 Hz. About 0.1 Hz to about 10 Hz is a typical frequency range for oscillations. In contrast thereto, mechanical vibrations have a frequency between about 25 Hz and about 400 Hz.

Additionally, the controller 200 may be configured to detect more than one oscillation in the process data during the step of performing oscillation frequency estimation; the herein disclosed embodiments are not limited to a particular number of oscillations being damped.

There may be different ways to provide the damping signal 309 to the electrical drive 307. For example, the damping signal 309 may, in a step S108a, be added as an offset to a nominal reference signal 310 of the electrical drive 307.

The controller 200 may generate other types of control signals and provide these to the 308 process. For example, the controller 200 may be configured to, in an optional step S110, generate a control signal to manipulate a motor 306 of the electrical drive 307, The control signal comprises the damping signal and the nominal reference signal so as to change a set point of the motor 306. The controller 200 may then, in an optional step S112, provide the control signal to the electrical drive 307 for it to change the set point of the motor 306.

There may be different sources of process data. For example, the process data may be acquired from an electrical drive signal 311, suction conditions 312 of a compressor, discharge conditions 313 of the compressor, a mechanical signal 314, or any combination thereof. Alternatively, the process data may be a calculated variable.

In terms of the electrical drive signal, it may comprise specific drive related signals such as motor speed estimates, motor torque estimates, shaft power, Direct Current (DC) Voltage, Phase U current, speed, an error in speed control loop, or any combination thereof. In terms of the suction conditions, they may comprise suction temperature, suction flow and/or suction pressure. In terms of the discharge conditions, they may comprise charge temperature, discharge pressure, discharge flow, or any combination thereof. In terms of the mechanical signals, they may comprise vibration measurements, displacement measurements, shaft torque measurements, or any combination thereof.

In respect thereto, it is emphasized that the mechanical signals are used for damping oscillations. It is, however, envisioned that the herein disclosed mechanisms for actively damping oscillations in addition to generating a damping signal for damping oscillations could provide a damping signal for damping vibrations. The mechanical signals could thus additionally be used for damping vibrations.

There may be different ways for the controller 200 to perform the oscillation frequency estimation. For example, the controller 200 may perform frequency analysis. Particularly, the controller 200 may be configured to, in an optional step S104b, analyse the acquired process data by means of frequency analysis to detect presence of the oscillations in the process data. The controller 200 may then be configured to, in an optional step S104c, determine an oscillation frequency to be damped based on the frequency analysis.

Further, the controller 200 may be configured to enable an end-user to provide input regarding one or more frequency ranges which will not be damped: Hence, the controller 200 may be configured to, in an optional step S104a, receive input identifying at least one frequency range not to be damped. This at least one frequency range may then be excluded from the analyzing of the acquired process data in step S104b.

There may be different ways to analyze the acquired process data as in step S104b. For example, the acquired process data may be analyzed by means of a windowed discrete Fourier transform. The oscillation frequency estimation operates in time windows that have a window length at least twice that of the period of the oscillation to be damped. That is, the windowed discrete Fourier transform may operate in time windows of length 200 milliseconds to 100 seconds.

Figure 5:
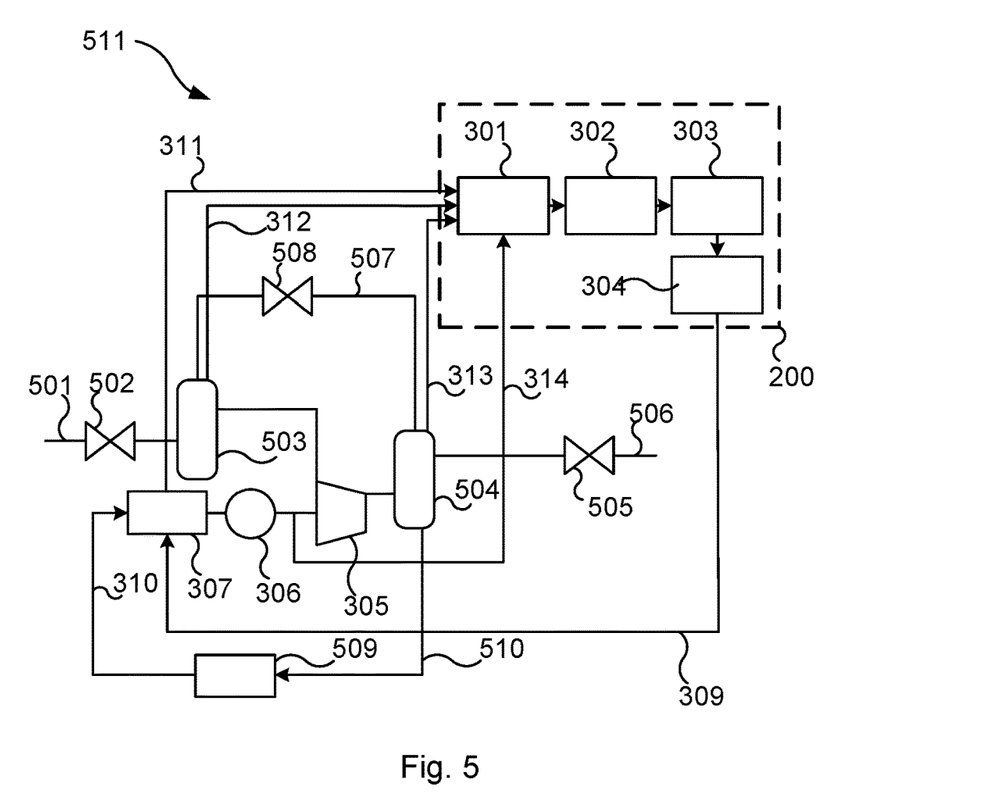
FIG. 5 is a schematic diagram illustrating a control system according to an embodiment.

There may be different kinds of oscillations. For example the oscillations may be induced by stick-slip of a recycle valve 508, interacting anti-surge and process control loops, manipulation of a suction valve 502, manipulation of a discharge valve 505, variations in suction header pressure, variations in discharge header pressure, or any combination thereof.

One particular embodiment for actively damping oscillations in a control process is shown in the control system 511 of FIG. 5. The control system 511 relates to an embodiment where a centrifugal gas compressor 305 receives natural gas from a suction header 501. Such a control system 511 can be used also for air, $CO_2$ compressors, nitrogen compressors and all other type of gas compressors, where basically similar problems are faced.

The gas flows through the suction valve 502, enters the suction volume 503 and is compressed by the gas compressor 305 driven by a motor 306. After passing through the discharge volume 504, the gas is either discharged through a discharge valve 505 to a discharge header 506 or recirculated over a recycle path 507 and a recycle valve 508 hack to the suction volume 503.

The motor 306 is controlled by an electrical drive 307 which receives a reference signal 310 from a process controller 509. The process controller 509 uses the feedback signal 510 of the discharge conditions (e.g. pressure, temperature, compressor flow) and compares it to the actual set point.

The controller 200 comprises the above disclosed functional modules 301, 302, 303, 304. The data acquisition module 301 acquires process data by means of inputs from electrical drive signals 311, from suction conditions 312 of the compressor 305, from the discharge conditions 313 of the compressor 305, and from mechanical signals 314. As noted above, the electrical drive signals 311 may comprise motor speed estimates, motor torque estimates, shaft power, DC Voltage, Phase U current, speed, error in speed control loop, etc. as noted above, the measurements of the suction conditions 312 and discharge conditions 313 may comprise suction temperature, suction pressure, discharge temperature, discharge pressure and either discharge flow or suction flow. As noted above, the mechanical signals 314 may comprise vibration measurements, displacement measurements, shaft torque measurements, etc. Note that at least one measurement source is necessary, whereas all combinations of different measurements can also be considered if the measurement equipment is in place. The minimum set of measurements may be represented by the suction and discharge condition of the gas compressor, which are always available for anti-surge and process control.

The data acquisition module 301 samples and stores the history of all signals. The oscillation detection module 302 analyzes the acquired signals using a windowed-discrete Fourier transform algorithm. The result of this analysis is a flag on either detected or not detected oscillations for each signal. If an oscillation is detected in a specific signal, oscillation frequency estimation is performed by the oscillation frequency estimation module 303 for that signal.

Several oscillation frequencies can be present in one signal, meaning that several oscillation frequencies can be detected.

Given the detected oscillation and the related frequencies, the damping generation module 304 generates the damping signal 309. This damping signal 309 is transmitted to the electrical drive 307, which then adds the damping signal 309 as a deviation on the nominal reference signal 310.

Typical execution periods of the controller 200 for the oscillation frequency estimation are in the range of 300-800 ms, but can be longer or shorter intervals which depend on the oscillation frequency that should be detected and damped.

In the presented embodiment the oscillations can be induced by stick-slip of the recycle valve 508, interacting anti-surge and process control loops, manipulation of suction valve 502 or discharge valve 505 as well as variations in suction header pressure and discharge header pressure.

One particular embodiment for realization of the functionality performed by the damping generator module 304 will now be disclosed. The damping generator module 304 can be implemented as damping filter for example using the following transfer function (in the Laplace transform domain):

$$y_{out} = \frac{\frac{k_1}{f_o} \cdot s}{\left(\frac{k_2}{f_o} \cdot s + 1\right) \cdot \left(\frac{k_3}{f_o} \cdot s + 1\right)} \cdot u_{in}$$

In this equation, $f_o$ is the frequency to be damped, $k_1$, $k_2$ and $k_3$ are tuning constants, $U_{in}$ is the incoming signal containing the oscillation, $y_{out}$ the signal 309 which damps the system, and s is a complex number. The damping filter basically shifts the oscillation phase of the original signal keeping at the same time the frequency $f_o$.

Assuming that the frequency $f_o$ to be damped is known, constant, and given as an end-user input, the active damping mechanism can be applied without estimating the frequency $f_o$.

Further, if a model is available the damping generation module 304 can be implemented using model based methods. One of them could be stated as an optimization problem in a moving horizon fashion, which would correspond to a damping model predictive control (MPC) controller.

Still further, if no process measurements and no mechanical measurements are available, the damping generation module 304 can still be employed by only analyzing the electrical signals available from the electrical drive 307. The functionality can be embedded in the drive control system and if the drive signals are sufficient to detect the oscillations on the process side, the damping action can be solely provided by the drive without external measurements. As noted above, such electrical signals may comprise motor speed estimates, motor torque estimates, shaft power, DC Voltage, Phase U current, speed, error in speed control loop, etc.

Figure 7:
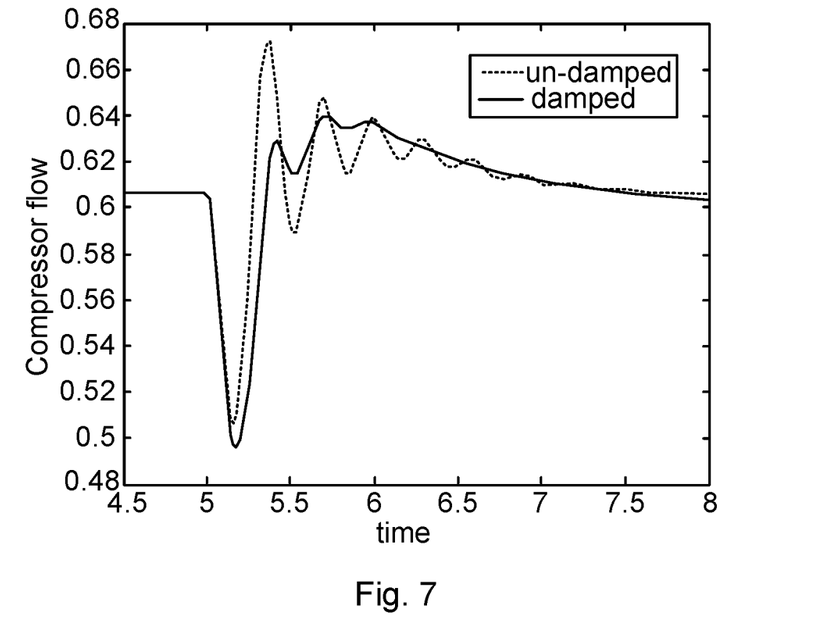
FIGS. 7 and 8 provide simulation results according to embodiments.
Figure 8:
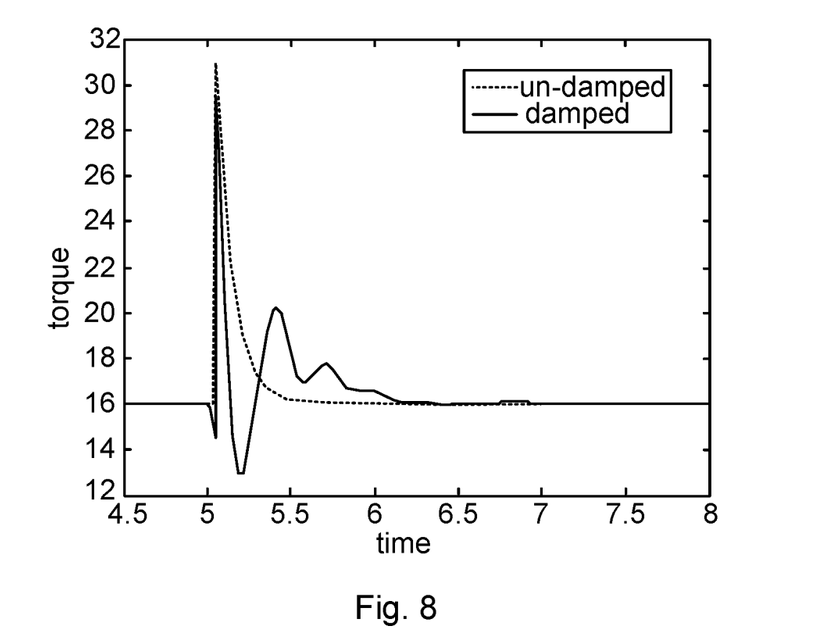

FIGS. 7 and 8 provide simulation results where the herein disclosed mechanisms for actively damping oscillations are compared to an un-damped compression process. FIG. 7 shows the results for compressor flow as a function of time, and FIG. 8 shows results for torque as a function of time. The scales on the axes are arbitrary and these figures are only provided to indicate a general comparison of an un-damped compression process to a damped compression process.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, only one of many possible standard gas compressor arrangements is schematically illustrated in FIG. 5. As is realized by the skilled person there are many variations using, for example, two recycle paths, a blow-off valve instead of recycle path, topologies with more than one compressor in parallel, serial and mixed arrangements, downstream cooler, upstream cooler, etc. for which the herein disclosed mechanisms for actively damping oscillations are equally applicable. Different arrangements can be envisioned depending on the available measurements and user specifications.

The invention claimed is:

1. A method for actively damping oscillations in a compression process, the method being performed by a controller, the method comprising:
    acquiring process data from the compression process;
    performing oscillation frequency estimation of any detected oscillations in the process data;
    generating a damping signal based on the oscillation frequency estimation, the damping signal being generated to dampen said any detected oscillations in the process data in a frequency range from 0.1 Hz to 10 Hz; and
    providing the damping signal to an electrical drive of the compression process,
    wherein the process data is acquired from at least one of suction conditions of a compressor or discharge conditions of the compressor,
    wherein the compression process is of a centrifugal gas compressor, and
    wherein the damping signal is provided to the electrical drive of the centrifugal gas compressor.

2. The method according to claim 1, wherein providing the damping signal further comprises:
    adding the damping signal as an offset to a nominal reference signal of the electrical drive.

3. The method according to claim 1, wherein the method further comprises:
    generating a control signal to manipulate a motor of the electrical drive, wherein the control signal comprises the damping signal and the nominal reference signal so as to change a set point of the motor; and
    providing the control signal to the electrical drive for it to change the set point of the motor.

4. The method according to claim 1, wherein the process data is a calculated variable.

5. The method according to claim 1, wherein the suction conditions comprises at least one of suction temperature, suction flow, and suction pressure.

6. The method according to claim 1, wherein the discharge conditions comprises at least one of discharge temperature, discharge flow and discharge pressure.

7. The method according to claim 1, wherein the oscillation frequency estimation comprises:
    analyzing the acquired process data by means of frequency analysis to detect presence of the oscillations in the process data; and
    determining an oscillation frequency to be damped based on the frequency analysis.

8. The method according to claim 7, wherein the oscillation frequency estimation comprises:
    receiving input identifying at least one frequency range not to be damped; and wherein said at least one frequency range is excluded from said analyzing of the acquired process data.

9. The method according to claim 7, wherein the acquired process data is analyzed by means of a windowed discrete Fourier transform.

10. The method according to claim 9, wherein the oscillation frequency estimation operates in time windows of length 200 milliseconds to 100 seconds.

11. The method according to claim 1, wherein the any detected oscillations are induced by at least one of stick-slip of a recycle valve, interacting anti-surge and process control loops, manipulation of a suction valve, manipulation of a discharge valve, variations in suction header pressure, and variations in discharge header pressure.

12. A controller for actively damping oscillations in a compression process, the controller comprising processing circuitry, the processing circuitry being configured to cause the controller to execute a method including:
    acquiring process data from the compression process;
    performing oscillation frequency estimation of any detected oscillations in the process data;
    generating a damping signal based on the oscillation frequency estimation, the damping signal being generated to dampen said any detected oscillations in the process data in a frequency range from 0.1 Hz to 10 Hz; and
    providing the damping signal to an electrical drive of the compression process,
    wherein the process data is acquired from at least one of suction conditions of a compressor or discharge conditions of the compressor,
    wherein the compression process is of a centrifugal gas compressor, and
    wherein the damping signal is provided to the electrical drive of the centrifugal gas compressor.

13. A controller for actively damping oscillations in a compression process, the controller comprising:
    a data acquisition module configured to acquire process data from the compression process;
    an oscillation frequency estimation module configured to perform oscillation frequency estimation of any detected oscillations in the process data;
    a damping generation module configured to generate a damping signal based on the oscillation frequency estimation, the damping signal being generated to dampen said any detected oscillations in the process data in a frequency range from 0.1 Hz to 10 Hz; and
    wherein the damping generation module further is configured to provide the damping signal to an electrical drive of the compression process,
    wherein the process data is acquired from at least one of suction conditions of a compressor or discharge conditions of the compressor,
    wherein the compression process is of a centrifugal gas compressor, and
    wherein the damping signal is provided to the electrical drive of the centrifugal gas compressor.

* * * * *